United States Patent
Schmitz et al.

(10) Patent No.: US 10,055,781 B2
(45) Date of Patent: Aug. 21, 2018

(54) SYSTEMS, METHODS AND DEVICES FOR CONTROLLING HUMIDITY IN A CLOSED ENVIRONMENT WITH AUTOMATIC AND PREDICTIVE IDENTIFICATION, PURCHASE AND REPLACEMENT OF OPTIMAL HUMIDITY CONTROLLER

(71) Applicant: Boveda Inc., Minnetonka, MN (US)

(72) Inventors: Jason L. Schmitz, Akron, OH (US);
Robert L. Esse, Monticello, MN (US);
Sean A. Knutsen, Chanhassen, MN (US)

(73) Assignee: Boveda Inc., Minnetonka, MN (US)

( * ) Notice: Subject to any disclaimer, the term of this patent is extended or adjusted under 35 U.S.C. 154(b) by 0 days.

(21) Appl. No.: 14/732,079

(22) Filed: Jun. 5, 2015

(65) Prior Publication Data

US 2016/0358244 A1 Dec. 8, 2016

(51) Int. Cl.
*G06Q 30/06* (2012.01)
*G06Q 10/00* (2012.01)

(52) U.S. Cl.
CPC ......... *G06Q 30/0635* (2013.01); *G06Q 10/20* (2013.01); *G06Q 30/0631* (2013.01)

(58) Field of Classification Search
CPC ........................................ G06Q 30/06–30/08
USPC ................................................ 705/26.1–27.2
See application file for complete search history.

(56) References Cited

U.S. PATENT DOCUMENTS

| | | |
|---|---|---|
| 4,567,563 A | 1/1986 | Hirsch |
| 5,021,939 A | 7/1991 | Pulgiese |
| 5,353,862 A | 10/1994 | Akiyama |
| 5,546,974 A | 8/1996 | Bireley |
| 5,563,811 A | 10/1996 | Embree |

(Continued)

FOREIGN PATENT DOCUMENTS

| | | |
|---|---|---|
| CA | 2785404 | 2/2014 |
| CN | 2461094 | 11/2001 |

(Continued)

OTHER PUBLICATIONS

Desiccant Technology for HVAC Applications, Andrew Lowenstein, PhD, Apr. 16, 2008.*

(Continued)

*Primary Examiner* — Ming Shui
(74) *Attorney, Agent, or Firm* — Winthrop & Weinstine P.A.

(57) ABSTRACT

The invention relates to systems and methods for monitoring and providing humidity control for an asset within a closed environment such as a storage container, with transmission of sensed humidity levels to at least one server that stores current and historical humidity levels and comprises a processor and stored executable instructions that, when executed by the processor, may recommend an optimal humidity controller to use for the asset, determine when the recommended humidity controller requires replacement and predictively recommend an optimal replacement humidity controller based on at least historical humidity data and trending thereof, execution of a sales transaction, that may be pre-scheduled based on asset type, asset size and/or historical data, for the optimal replacement humidity controller, and providing the proper replacement humidity controller to the user.

21 Claims, 4 Drawing Sheets

(56) References Cited

U.S. PATENT DOCUMENTS

| | | | |
|---|---|---|---|
| 5,621,669 A | 4/1997 | Bjornsson | |
| 5,743,465 A | 4/1998 | Jeong | |
| 5,764,065 A | 6/1998 | Richards et al. | |
| 5,798,945 A | 8/1998 | Benda | |
| 5,936,178 A * | 8/1999 | Saari | A24F 25/02 84/453 |
| 6,157,306 A | 12/2000 | Mularoni | |
| 6,192,325 B1 | 2/2001 | Piety et al. | |
| 6,198,394 B1 | 3/2001 | Jacobsen et al. | |
| 6,209,717 B1 | 4/2001 | Flynn | |
| 6,326,930 B1 | 12/2001 | Jones | |
| 6,385,510 B1 | 5/2002 | Hoog et al. | |
| 6,450,411 B1 | 9/2002 | Rash et al. | |
| 6,452,499 B1 | 9/2002 | Runge et al. | |
| 6,553,336 B1 | 4/2003 | Johnson et al. | |
| 6,567,769 B2 | 5/2003 | Chang | |
| 6,573,837 B2 | 6/2003 | Bluteau | |
| 6,643,801 B1 | 11/2003 | Jammu et al. | |
| 6,685,104 B1 | 2/2004 | Float et al. | |
| 6,693,535 B2 | 2/2004 | Von Bosch et al. | |
| 6,701,274 B1 | 3/2004 | Eryurek et al. | |
| 6,738,748 B2 | 5/2004 | Wetzer | |
| 6,799,154 B1 | 9/2004 | Aragones et al. | |
| 6,822,200 B1 | 11/2004 | Grosch et al. | |
| 6,826,514 B1 | 11/2004 | Antico et al. | |
| 6,850,162 B2 | 2/2005 | Cacioli et al. | |
| 6,919,803 B2 | 7/2005 | Breed | |
| 6,932,856 B2 | 8/2005 | Rake | |
| 6,977,585 B2 | 12/2005 | Falk et al. | |
| 7,015,713 B2 | 3/2006 | Kou | |
| 7,015,789 B1 | 3/2006 | Helgeson | |
| 7,053,765 B1 | 5/2006 | Clark | |
| 7,110,862 B2 | 9/2006 | Park | |
| 7,140,468 B2 | 11/2006 | Rake et al. | |
| 7,234,313 B2 | 6/2007 | Bell et al. | |
| 7,266,960 B2 | 9/2007 | Shah | |
| 7,315,246 B2 | 1/2008 | Rajapakse et al. | |
| RE40,073 E | 2/2008 | Breed | |
| 7,343,136 B2 | 3/2008 | Liu et al. | |
| 7,378,954 B2 | 5/2008 | Wendt | |
| 7,456,736 B2 | 11/2008 | Primm et al. | |
| 7,516,740 B2 | 4/2009 | Meier | |
| 7,528,711 B2 | 5/2009 | Kates | |
| 7,574,283 B2 | 8/2009 | Wang et al. | |
| 7,658,336 B2 | 2/2010 | Kates | |
| 7,710,256 B2 | 5/2010 | Tawil | |
| 7,733,236 B2 | 6/2010 | Montena et al. | |
| 7,751,942 B2 | 7/2010 | Lorton et al. | |
| 7,764,180 B2 | 7/2010 | Huang | |
| 7,777,496 B2 | 8/2010 | Evans et al. | |
| 7,810,515 B2 | 10/2010 | Nies et al. | |
| 7,854,389 B2 | 12/2010 | Ahmed | |
| 7,920,601 B2 | 4/2011 | Andrus et al. | |
| 7,933,836 B2 | 4/2011 | Erhart et al. | |
| 7,961,093 B2 | 6/2011 | Chiao et al. | |
| 8,006,407 B2 | 8/2011 | Anderson | |
| 8,020,777 B2 | 9/2011 | Kates | |
| 8,085,145 B2 | 12/2011 | Fu et al. | |
| 8,145,330 B2 | 3/2012 | Emoto | |
| 8,154,398 B2 | 4/2012 | Rolf et al. | |
| 8,159,338 B2 | 4/2012 | Breed | |
| 8,224,034 B2 | 7/2012 | Tanaka et al. | |
| 8,225,810 B2 | 7/2012 | Blanchard | |
| 8,245,720 B2 | 8/2012 | Grill et al. | |
| 8,258,943 B2 | 9/2012 | Park et al. | |
| 8,280,555 B2 | 10/2012 | Masui et al. | |
| 8,294,373 B2 | 10/2012 | Ko et al. | |
| 8,302,881 B1 | 11/2012 | Campbell et al. | |
| 8,310,363 B2 | 11/2012 | Breed | |
| 8,339,263 B2 | 12/2012 | Paananen et al. | |
| 8,350,710 B2 | 1/2013 | Logan et al. | |
| 8,351,199 B2 | 1/2013 | Tian et al. | |
| 8,374,725 B1 | 2/2013 | Ols | |
| 8,396,821 B2 | 3/2013 | Kuhns et al. | |
| 8,434,804 B2 | 5/2013 | Slessman | |
| 8,447,703 B2 | 5/2013 | Yuasa et al. | |
| 8,491,702 B2 | 7/2013 | Bash et al. | |
| 8,536,998 B1 | 9/2013 | Siu et al. | |
| 8,547,237 B2 | 10/2013 | Adebimpe | |
| 8,558,687 B2 | 10/2013 | Haupt et al. | |
| 8,577,359 B2 | 11/2013 | Wesby | |
| 8,579,264 B2 | 11/2013 | Fowles | |
| 8,599,012 B2 | 12/2013 | Schechter et al. | |
| 8,622,955 B2 | 1/2014 | Moberg et al. | |
| 8,640,360 B2 | 2/2014 | Stamm et al. | |
| 8,648,395 B2 | 2/2014 | Cummins | |
| 8,649,907 B2 | 2/2014 | Ersavas | |
| 8,694,277 B2 | 4/2014 | Corwin et al. | |
| 8,695,888 B2 | 4/2014 | Kates | |
| 8,748,723 B1 | 6/2014 | Egberg et al. | |
| 8,749,366 B2 | 6/2014 | Hwang et al. | |
| 8,793,024 B1 | 7/2014 | Woytowitz et al. | |
| 2002/0031142 A1 | 3/2002 | Metin et al. | |
| 2002/0033759 A1 | 3/2002 | Morello | |
| 2002/0070129 A1 | 6/2002 | Tunstall-Behrens | |
| 2002/0095269 A1 | 7/2002 | Natalini et al. | |
| 2004/0073468 A1 | 4/2004 | Vyas et al. | |
| 2004/0148136 A1 | 7/2004 | Sasaki et al. | |
| 2004/0222306 A1 | 11/2004 | Fajarillo | |
| 2004/0243737 A1 | 12/2004 | Beardsley et al. | |
| 2005/0054897 A1 | 3/2005 | Hashimoto et al. | |
| 2005/0088300 A1 | 4/2005 | Leung | |
| 2005/0151656 A1 | 7/2005 | Yuen | |
| 2006/0048845 A1 | 3/2006 | Slavin et al. | |
| 2006/0174693 A1 | 8/2006 | Chen et al. | |
| 2006/0226037 A1 | 10/2006 | Field | |
| 2007/0004449 A1 | 1/2007 | Sham | |
| 2007/0023940 A1 | 2/2007 | Siess, III | |
| 2007/0026107 A1 | 2/2007 | Wang et al. | |
| 2007/0033113 A1 | 2/2007 | Trew | |
| 2007/0089365 A1 | 4/2007 | Rowe | |
| 2007/0126433 A1 | 6/2007 | Theophanous et al. | |
| 2007/0246642 A1 | 10/2007 | Millett et al. | |
| 2007/0276626 A1 | 11/2007 | Bruffey | |
| 2007/0299706 A1 | 12/2007 | Galt et al. | |
| 2008/0058740 A1 | 3/2008 | Sullivan et al. | |
| 2008/0064420 A1 | 3/2008 | Aldern et al. | |
| 2008/0073431 A1 | 3/2008 | Davis | |
| 2008/0074274 A1 | 3/2008 | Hu et al. | |
| 2008/0104976 A1 | 5/2008 | Guglielmetti et al. | |
| 2008/0217419 A1 | 9/2008 | Ehlers et al. | |
| 2008/0219193 A1 | 9/2008 | Tang et al. | |
| 2008/0287747 A1 | 11/2008 | Mestrovic et al. | |
| 2009/0039173 A1 | 2/2009 | Mammon | |
| 2009/0069642 A1 | 3/2009 | Gao et al. | |
| 2009/0080428 A1 | 3/2009 | Witkowski et al. | |
| 2009/0177330 A1 | 7/2009 | Kah, Jr. | |
| 2009/0179338 A1 | 7/2009 | Cottier | |
| 2009/0185959 A1 | 7/2009 | Weber et al. | |
| 2009/0223128 A1 | 9/2009 | Kuschak | |
| 2009/0293524 A1 | 12/2009 | Vezina et al. | |
| 2009/0307000 A1 | 12/2009 | Scheid et al. | |
| 2009/0322542 A1 | 12/2009 | Ding et al. | |
| 2010/0012739 A1* | 1/2010 | Hoeth | G10G 7/00 236/44 C |
| 2010/0038440 A1 | 2/2010 | Ersavas | |
| 2010/0156663 A1 | 6/2010 | Pal et al. | |
| 2010/0275919 A1 | 11/2010 | Sung | |
| 2010/0282184 A1 | 11/2010 | Larson | |
| 2011/0003547 A1 | 1/2011 | Oh et al. | |
| 2011/0057812 A1 | 3/2011 | Matsuda et al. | |
| 2011/0061477 A1 | 3/2011 | Fitz | |
| 2011/0082599 A1 | 4/2011 | Shinde et al. | |
| 2011/0112692 A1 | 5/2011 | Chan | |
| 2011/0137472 A1 | 6/2011 | Hitt et al. | |
| 2011/0230160 A1 | 9/2011 | Felgate | |
| 2011/0277547 A1 | 11/2011 | Duncan | |
| 2012/0019382 A1 | 1/2012 | Köhler et al. | |
| 2012/0023428 A1 | 1/2012 | Kennard et al. | |
| 2012/0109387 A1 | 5/2012 | Martin et al. | |
| 2012/0150677 A1* | 6/2012 | Shuster | G06Q 30/0601 705/26.1 |
| 2012/0205455 A1 | 8/2012 | Campo | |
| 2012/0221154 A1 | 8/2012 | Runge | |

(56) References Cited

U.S. PATENT DOCUMENTS

| | | |
|---|---|---|
| 2012/0229277 A1 | 9/2012 | Gabriel et al. |
| 2012/0297646 A1 | 11/2012 | Brault |
| 2013/0036755 A1 | 2/2013 | Kang |
| 2013/0046398 A1 | 2/2013 | Hain et al. |
| 2013/0053988 A1 | 2/2013 | Lin |
| 2013/0063602 A1 | 3/2013 | Scapier |
| 2013/0097276 A1 | 4/2013 | Sridhar |
| 2013/0111077 A1 | 5/2013 | Gowravaram et al. |
| 2013/0118070 A1 | 5/2013 | Marquez |
| 2013/0133404 A1 | 5/2013 | Patel et al. |
| 2013/0158722 A1 | 6/2013 | Chen et al. |
| 2013/0160522 A1 | 6/2013 | Kromrey |
| 2013/0167571 A1 | 7/2013 | Nakagawa |
| 2013/0182360 A1 | 7/2013 | Stevens et al. |
| 2013/0186965 A1 | 7/2013 | Wang et al. |
| 2013/0199772 A1 | 8/2013 | Fischer et al. |
| 2013/0215548 A1 | 8/2013 | Eastman et al. |
| 2013/0220708 A1 | 8/2013 | Kim et al. |
| 2013/0233933 A1 | 9/2013 | Dostmann |
| 2013/0255783 A1 | 10/2013 | Runge et al. |
| 2013/0271286 A1 | 10/2013 | Quan et al. |
| 2013/0278427 A1 | 10/2013 | Setton |
| 2013/0289927 A1 | 10/2013 | Smith et al. |
| 2013/0297390 A1* | 11/2013 | Jaquez ............... G06Q 20/12 705/14.23 |
| 2013/0298421 A1 | 11/2013 | McCallum et al. |
| 2013/0311140 A1 | 11/2013 | Schechter |
| 2013/0339304 A1 | 12/2013 | Lee et al. |
| 2014/0048609 A1 | 2/2014 | Chen et al. |
| 2014/0055346 A1 | 2/2014 | Boni et al. |
| 2014/0074730 A1 | 3/2014 | Arensmeier et al. |
| 2014/0097273 A1 | 4/2014 | Helms et al. |
| 2014/0116267 A1 | 5/2014 | Hochschild, Jr. et al. |
| 2014/0118135 A1 | 5/2014 | O'Brien et al. |
| 2014/0141800 A1 | 5/2014 | Eum et al. |
| 2014/0148220 A1 | 5/2014 | Park et al. |
| 2014/0151456 A1 | 6/2014 | McCurnin et al. |
| 2014/0188287 A1 | 7/2014 | Sabata |
| 2014/0189443 A1 | 7/2014 | Xu et al. |

FOREIGN PATENT DOCUMENTS

| | | |
|---|---|---|
| CN | 1657931 | 8/2005 |
| CN | 1695420 | 11/2005 |
| CN | 1949814 | 4/2007 |
| CN | 201181992 | 1/2009 |
| CN | 201218741 | 4/2009 |
| CN | 201242247 | 5/2009 |
| CN | 101539539 | 9/2009 |
| CN | 101571309 | 11/2009 |
| CN | 201357149 | 12/2009 |
| CN | 201382500 | 1/2010 |
| CN | 201392482 | 1/2010 |
| CN | 201413484 | 2/2010 |
| CN | 201414327 | 3/2010 |
| CN | 101739798 | 6/2010 |
| CN | 101763704 | 6/2010 |
| CN | 201522662 | 7/2010 |
| CN | 101803544 | 8/2010 |
| CN | 101846669 | 9/2010 |
| CN | 101847017 | 9/2010 |
| CN | 201570902 | 9/2010 |
| CN | 201622689 | 11/2010 |
| CN | 201663360 | 12/2010 |
| CN | 201689089 | 12/2010 |
| CN | 201750222 | 2/2011 |
| CN | 201752200 | 3/2011 |
| CN | 201777462 | 3/2011 |
| CN | 201796004 | 4/2011 |
| CN | 102037888 | 5/2011 |
| CN | 201837910 | 5/2011 |
| CN | 201927167 | 8/2011 |
| CN | 102223274 | 10/2011 |
| CN | 202018607 | 10/2011 |
| CN | 102252405 | 11/2011 |
| CN | 202033677 | 11/2011 |
| CN | 202058270 | 11/2011 |
| CN | 202066607 | 12/2011 |
| CN | 202067169 | 12/2011 |
| CN | 202067380 | 12/2011 |
| CN | 202093371 | 12/2011 |
| CN | 202093402 | 12/2011 |
| CN | 102313341 | 1/2012 |
| CN | 202102281 | 1/2012 |
| CN | 202121608 | 1/2012 |
| CN | 202127426 | 1/2012 |
| CN | 102359735 | 2/2012 |
| CN | 202133654 | 2/2012 |
| CN | 202141282 | 2/2012 |
| CN | 202150163 | 2/2012 |
| CN | 102385793 | 3/2012 |
| CN | 102393057 | 3/2012 |
| CN | 202162884 | 3/2012 |
| CN | 102419082 | 4/2012 |
| CN | 202188865 | 4/2012 |
| CN | 102437649 | 5/2012 |
| CN | 102495595 | 6/2012 |
| CN | 102497390 | 6/2012 |
| CN | 102507907 | 6/2012 |
| CN | 202268064 | 6/2012 |
| CN | 102550373 | 7/2012 |
| CN | 102564106 | 7/2012 |
| CN | 102568171 | 7/2012 |
| CN | 202331165 | 7/2012 |
| CN | 202339622 | 7/2012 |
| CN | 202340556 | 7/2012 |
| CN | 102628603 | 8/2012 |
| CN | 102629126 | 8/2012 |
| CN | 102662423 | 9/2012 |
| CN | 202452627 | 9/2012 |
| CN | 102715043 | 10/2012 |
| CN | 102738895 | 10/2012 |
| CN | 102749891 | 10/2012 |
| CN | 202486945 | 10/2012 |
| CN | 102792877 | 11/2012 |
| CN | 202520602 | 11/2012 |
| CN | 102832714 | 12/2012 |
| CN | 202583176 | 12/2012 |
| CN | 202600541 | 12/2012 |
| CN | 202631520 | 12/2012 |
| CN | 102865648 | 1/2013 |
| CN | 102880152 | 1/2013 |
| CN | 102886772 | 1/2013 |
| CN | 202635267 | 1/2013 |
| CN | 202649748 | 1/2013 |
| CN | 202661434 | 1/2013 |
| CN | 202661897 | 1/2013 |
| CN | 202679072 | 1/2013 |
| CN | 202692316 | 1/2013 |
| CN | 102929240 | 2/2013 |
| CN | 102945056 | 2/2013 |
| CN | 202720281 | 2/2013 |
| CN | 202728908 | 2/2013 |
| CN | 202773568 | 3/2013 |
| CN | 103048971 | 4/2013 |
| CN | 103064452 | 4/2013 |
| CN | 202854634 | 4/2013 |
| CN | 202862191 | 4/2013 |
| CN | 202870602 | 4/2013 |
| CN | 202890129 | 4/2013 |
| CN | 202903721 | 4/2013 |
| CN | 202904845 | 4/2013 |
| CN | 202907567 | 5/2013 |
| CN | 202916952 | 5/2013 |
| CN | 202948006 | 5/2013 |
| CN | 202956127 | 5/2013 |
| CN | 202956643 | 5/2013 |
| CN | 103135639 | 6/2013 |
| CN | 103141365 | 6/2013 |
| CN | 103168659 | 6/2013 |
| CN | 103179297 | 6/2013 |
| CN | 202958762 | 6/2013 |
| CN | 103197625 | 7/2013 |

(56) References Cited

FOREIGN PATENT DOCUMENTS

| | | |
|---|---|---|
| CN | 103225856 | 7/2013 |
| CN | 203037289 | 7/2013 |
| CN | 203037291 | 7/2013 |
| CN | 203054539 | 7/2013 |
| CN | 203069572 | 7/2013 |
| CN | 203083077 | 7/2013 |
| CN | 203083615 | 7/2013 |
| CN | 203087145 | 7/2013 |
| CN | 203100774 | 7/2013 |
| CN | 103234578 | 8/2013 |
| CN | 103248057 | 8/2013 |
| CN | 203117820 | 8/2013 |
| CN | 203148469 | 8/2013 |
| CN | 103297537 | 9/2013 |
| CN | 203194240 | 9/2013 |
| CN | 203217406 | 9/2013 |
| CN | 203226108 | 10/2013 |
| CN | 203250160 | 10/2013 |
| CN | 203250230 | 10/2013 |
| CN | 203274109 | 11/2013 |
| CN | 203290012 | 11/2013 |
| CN | 203366161 | 12/2013 |
| CN | 203366482 | 12/2013 |
| CN | 103488160 | 1/2014 |
| CN | 203378526 | 1/2014 |
| CN | 203396500 | 1/2014 |
| CN | 203397185 | 1/2014 |
| CN | 103548647 | 2/2014 |
| CN | 103583318 | 2/2014 |
| CN | 203455728 | 2/2014 |
| CN | 103631242 | 3/2014 |
| CN | 103644627 | 3/2014 |
| CN | 203502813 | 3/2014 |
| CN | 103699061 | 4/2014 |
| CN | 103759767 | 4/2014 |
| CN | 103760849 | 4/2014 |
| CN | 203533800 | 4/2014 |
| CN | 203561906 | 4/2014 |
| CN | 103885509 | 6/2014 |
| EP | 1083390 | 12/2002 |
| EP | 1756783 | 2/2007 |
| EP | 1817529 | 8/2007 |
| EP | 1990080 | 11/2008 |
| EP | 2016425 | 1/2009 |
| EP | 2020647 | 2/2009 |
| EP | 2157491 | 2/2010 |
| EP | 2683146 | 1/2014 |
| JP | 2003130964 | 5/2003 |
| JP | 2008146612 | 6/2008 |
| JP | 4947283 | 3/2012 |
| WO | 8704275 | 7/1987 |
| WO | 2008097005 | 8/2008 |
| WO | 2008150815 | 12/2008 |
| WO | 2008153275 | 12/2008 |
| WO | 2010043368 | 4/2010 |
| WO | 2011034302 | 3/2011 |
| WO | 2012016432 | 2/2012 |
| WO | 2013057146 | 4/2013 |
| WO | 2013166972 | 11/2013 |
| WO | 2013175741 | 11/2013 |
| WO | 2014015141 | 1/2014 |
| WO | 2014081276 | 5/2014 |
| WO | 2014101032 | 7/2014 |

OTHER PUBLICATIONS

Envoirnmental Guidelines for the Storage of Paper Records, http://www.niso.org/publications/tr/tr01.pdf, William K. Wilson. (Year: 1995).*
https://www.acurite.com/learn/case-study/how-acurite-helps-musicians-preserve-vintage-instruments.*
"Sensorist—Online Wire Sensors: Hardware." URL:<http://sensorist.com/hardware> Copyright 2015, obtained from the Internet Nov. 20,2015 (3 pages).
"Sensorist—Online Wire Sensors: Software." URL:<http://sensorist.com/software> Copyright 2015, obtained from the Internet Nov. 20,2015 (2 pages).
"Yifang Digital SH412." URL:<http://www.yifangdigital.com/product/SH412.aspx> Copyright 2005-2011, obtained from the Internet Nov. 20, 2015 (2 pages).
"FilesThruTheAir WiFi Devices." URL:<http:www.filesthrutheair.com/wifi-devices-range> Copyright 2014, obtained from the Internet Nov. 20, 2015 (2 pages).
"Wireless Temperature Monitoring Technology, Senso Scientific." URL<http://www.sensoscientific.com/services/technology/> Jan. 4, 2012, obtained from the Internet Nov. 20, 2015 (4 pages).
"Founten Wireless Communicating Thermostat with Humidity Control (FS-STAT-32ACH)", URL:<http://www.founten.com/portfolio-view/wireless-communicating-thermostat-with-humidity-control/> Obtained from the Internet Nov. 20, 2015 (3 pages).
"Room Alert 3 Wi-Fi Temperature & Environment Monitoring", URL:<http://www.roomalert.com> Copyright 1988-2015, obtained from the Internet Nov. 20, 2015 (7 pages).
"Thermo Recorder Network Dedicated Temperature/Humidity Data Logger TR-71W and TR-72W", T&D Corporation, Apr. 2009 (4 pages).
"Real-Time Monitoring From Anywhere," Temperature Alert, URL:<http:www.temperaturealert.com> Copyright 2014, obtained from the Internet Nov. 20, 2015 (3 pages).
"Temperature@lert WiFi Edition-WiFi Temperature Monitoring Systems", URL:<http://www.temperaturealert.com/Wireless-Temperature-Store/Temperature-Alert-WiFi-Sensor.aspx> Obtained from the Internet Nov. 20, 2015 (2 pages).
"Temperature@lert Sensor Cloud", URL:<http://www.temperaturealert.com/Remote-Temperature/Sensor-Cloud.aspx> Obtained from the Internet Nov. 20, 2015 (3 pages).
"Elpro Central Monitoring Systems" URL:<http://www.elpro.com/en/solutions/central-monitoring-systems> Copyright 2014, obtained from the Internet May 29, 2014 (7 pages).
"AirQ 110 Humidity Sensor" URL:<http://www.airqnetworks.com/products/wireless-sensors/wireless-humidity-sensor> Copyright 2010-2014, obtained from the Internet Nov. 20, 2015 (4 pages).
"AirQ 111 Dual Sensor" URL:<http://www.airqnetworks.com/products/wireless-sensors/wireless-temperature-and-humidity-sensor> Copyright 2010-2014, obtained from the Internet Nov. 20, 2015 (4 pages).
"ConnectSense Wireless Temperature Sensor" URL:<https://www.connectsense.com/wireless-temperature-sensor> Copyright 2015, obtained from the Internet Nov. 20, 2015 (3 pages).
"ArtTrac Technology's Temperature, Dew Point, and Humidity Sensors" URL:<http://www.arttrac.net?p=224> Oct. 10, 2011, obtained from the Internet Nov. 20, 2015 (2 pages).
"EL-WiFi-TH WiFi Temperature & Humidity Data Logging Sensor" URL:<http://www.lascarelectronics.com/temperaturedatalogger.php?location=uk&datalogger=424> Obtained from the Internet May 29, 2014 (1 page).
"Send Data to Your Smartphone with T&D WiFi Data Loggers" CAS Data Loggers, URL:<https://www.dataloggerinc.com/content/news/product_anouncements/632/send_data_to_your_smartphone_with_tandd_wifi_data_loggers/> Nov. 18, 2013, obtained from the Internet Nov. 20, 2015 (5 pages).
"Accsense Wireless Monitoring and Alarming Systems" CAS Data Loggers, URL:<http://www.dataloggerinc.com/manufacturers/Accsense_Monitoring/3/> Copyright 2015, obtained from the Internet Nov. 20, 2015 (11 pages).
Elias, Andre G. F. et al. "A Ubiquitous Model for Wireless Sensor Networks Monitoring", 2012 Sixth International Conference on Innovative Mobile and Internet Services in Ubiquitous Computing, Jul. 4-6, 2012 (pp. 835-839).
"Web ID Wireless Temperature Monitoring Solutions" URL:<http://www.webidsystems.com.au/> Obtained from the Internet Nov. 20, 2015 (3 pages).
"WebIO Internet Control" URL:<http://www.webio.us/version3/> Obtained from the Internet Nov. 20, 2015 (6 pages).
"Wireless Sensor Tag System: Monitor Everything from the Internet" URL:<https://www.mytaglist.com> Copyright 2010-2014, obtained from the Internet May 29, 2014 (7 pages).

(56) References Cited

OTHER PUBLICATIONS

"Sensor Gateway, the base unit for the sensors" URL:<http://www.serverscheck.com/sensors/> Copyright 2003-2015, obtained from the Internet Nov. 20, 2015 (5 pages).

"Technology: Tern perature Humidity Monitoring" URL:<http://cellularmachines.com/technology/> Obtained from the Internet May 29, 2014 (6 pages).

"Wireless Humidity and Temperature Monitoring and Alarming System: OM-CP-THERMALERT-RH" URL:<http://www.omega.com/pptst/OM-CP-THERMALERT-RH.html> Copyright 2003-2015, obtained from the Internet Nov. 20, 2015 (3 pages).

"Wireless Transmitter Receiver for Web-Based Process Monitoring: UWTC-REC3" URL:<http://www.omega.com/pptst/UWTC-REC3.html> Copyright 2003-2015, obtained from the Internet Nov. 20, 2015 (3 pages).

"NotifEye Humidity Sensor Model #15120" URL:<http://www.cooper-atkins.com/Products/NotifEye/Hurnidity_Sensor_15120/> Copyright 2009-2015, obtained from the Internet Nov. 20, 2015 (2 pages).

"Ekahua Vision™ Business Intelligence Software" URL:<http://www.ekahau.com/real-time-location-system/technology/ekahau-vision> Copyright 2015, obtained from the Internet Nov. 20, 2015 (9 pages).

"WiFi Temperature and Humidity Sensors" URL:<http://www.corintech.com/wifi-sensors> Copyright 2014, obtained from the Internet May 29, 2014 (3 pages).

"Elertus Smart Sensor Review: New Age Hygrometer", Stogie Fresh, URL:<http://www.stogiefresh.info/edu-humidors/articles/review-elertus.html> Dated Jan. 6, 2014, obtained from the Internet Nov. 20, 2015 (3 pages).

"La Crosse Remote Temperature & Humidity Monitor for Wine Cellar, Model D111.E1.BP.WI", Sylvane Inc., Copyright 2014 (5 pages).

"Humidor Alerts—Remote Sensor" URL:<http://www.canadahumidor.com/index.php?p=product&id=646&parent=8&is_print_version=true> Obtained from the Internet Apr. 30, 2014 (2 pages).

"Weather Environment System 01050C" URL:<http://www.acurite.com/acurite-professional-weather-center-with-aculink-remote-monitoring-weather-alerts-terriperature-humidity-wind-rain-01055.html> Obtained from the Internet Apr. 30, 2014 (2 pages).

"Alima: The smart indoor air quality monitor for your home" URL:<https://www.indiegogo.com/projects/alima-the-smart-indoor-air-quality-monitor-for-your-home#home> Obtained from the Internet Apr. 30, 2014 (21 pages).

"Web Sensor T3510-remote hygrometer with Ethernet interface", Comet System, URL:<http://www.cometsystem.cz/products/reg-T3510> Obtained from the Internet Apr. 30, 2014 (4 pages).

Ge, Wenqing et al. "Design of Temperature and Humidity Monitoring Terminal System Based on Android", 2012 3rd International Conference on System Science, Engineering Design and Manufacturing Informatization, Oct. 20-21, 2012 (pp. 98-100).

International Search Report and Written Opinion for related PCT Application PCT/US2016/036006, dated Oct. 7, 2016 (15 pages).

\* cited by examiner

SYSTEMS, METHODS AND DEVICES FOR CONTROLLING HUMIDITY IN A CLOSED ENVIRONMENT WITH AUTOMATIC AND PREDICTIVE IDENTIFICATION, PURCHASE AND REPLACEMENT OF OPTIMAL HUMIDITY CONTROLLER

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to systems and methods for monitoring and tracking while providing humidity control for an asset within a closed environment and automatic and predictive replacement of the humidity controller before reaching its end of life.

BACKGROUND OF THE INVENTION

Closed environments such as storage cases for instruments, particularly stringed instruments, cigars or other tobacco products require controlling of the relative humidity levels within the closed environments to optimally maintain the assets stored or housed therein.

In the case of musical instruments, atmospheric humidity can affect the lifespan and sound quality for stringed, woodwind, brass and percussion instruments. The presence or absence of optimal humidity levels can lead to swelling, splits, cracks, checking, movement in joins and general distortion of materials susceptible to too much or too little humidity.

Similarly, too much or too little atmospheric humidity can adversely affect the quality and/or lifespan of stored cigars or other tobacco products. Thus, humidors are provided to assist in maintaining not only humidity levels, but also temperature levels, within a desired range.

Humidity controllers are known in the art and may be considered for use in conjunction with the present invention. Particularly effective humidity controllers are marked by Boveda, Inc., and are described in detail in U.S. Pat. Nos. 5,936,178 and 8,748,723, the full disclosures of which are hereby incorporated by reference. See also U.S. Pat. No. 6,209,717, also incorporated in its entirety by reference. Generally, however, any humidity controller may be suitable for operation with the present invention as described and claimed.

Also known to the skilled artisan are systems and methods for wirelessly transmitting sensed humidity data, obtained within a closed environment by known humidity sensors, via a communication system for remote viewing by a user on a computing device such as a computer, tablet, and/or a smartphone.

There are, however, no known systems or methods that provide a predictive notification and automated purchase of an optimal humidity controller designed to maintain humidity levels for a specific type of asset. Further, there are no known systems or methods that predict and automatically set a replacement frequency for identifying and purchasing an optimal humidity controller for a specific asset type.

BRIEF SUMMARY OF THE INVENTION

Various embodiments of the invention comprise systems, server(s) and methods for monitoring and providing humidity control for an asset within a closed environment such as a storage container, with transmission of sensed humidity levels to at least one server that stores current and historical humidity levels and comprises a processor and stored executable instructions that, when executed by the processor, may recommend an optimal humidity controller to use for the asset, determine when the recommended humidity controller requires replacement and predictively recommend an optimal replacement humidity controller based on at least historical humidity data and trending thereof, execution of a sales transaction, that may be pre-scheduled based on asset type, asset size and/or historical data, for the optimal replacement humidity controller, and providing the proper replacement humidity controller to the user.

BRIEF DESCRIPTION OF THE SEVERAL VIEWS OF THE DRAWINGS

The following drawings are illustrative of embodiments of the invention and are not intended or to be interpreted as limiting the scope of the invention as encompassed by the claims.

DETAILED DESCRIPTION OF THE INVENTION

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

Generally, the present invention comprises systems, methods and servers configured to monitor and control humidity levels within a closed environment such as an instrument case or humidor or other closed environments housing assets in need of humidity control. More specifically, the invention comprises identification of an optimal humidity controller for the specific asset under consideration and/or identification of an optimal replacement humidity controller for the specific asset. In certain embodiments, these steps are executed automatically when the system, method and/or server determines that the currently used humidity controller is nearing the end of its useful life. In still further embodiments, a replacement frequency may be established for replacing the currently used humidity controller, and subsequently used replacement humidity controllers, shortly before the presently used humidity controller reaches the end of its useful life.

Figure 1A:
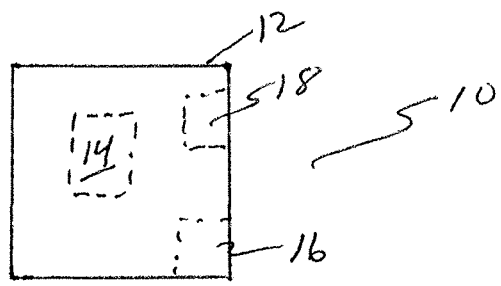
FIG. 1A is a schematic diagram of one embodiment of the present invention.
Figure 1B:
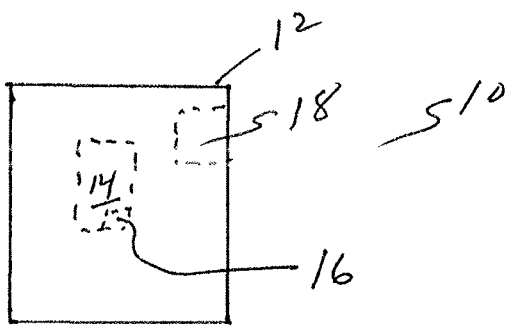
FIG. 1B is a schematic diagram of one embodiment of the present invention.

As illustrated in FIGS. 1A and 1B, a closed environment 10 is provided which may consist of a container 12 housing an asset 14 and humidity sensor 16 therein. Humidity sensor 16 may, alternatively, be located within the asset 14. Humidity controller 18 is also disposed within closed environment 10.

FIG. 1A illustrates the case where humidity controller 18 is located or disposed generally within the closed environment 10 and specifically within the container 12, but not inside the asset 14. FIG. 1B provides an alternative arrangement wherein the humidity controller 18 is disposed or located generally within the closed environment 10 and specifically within the asset 14.

Figure 2:
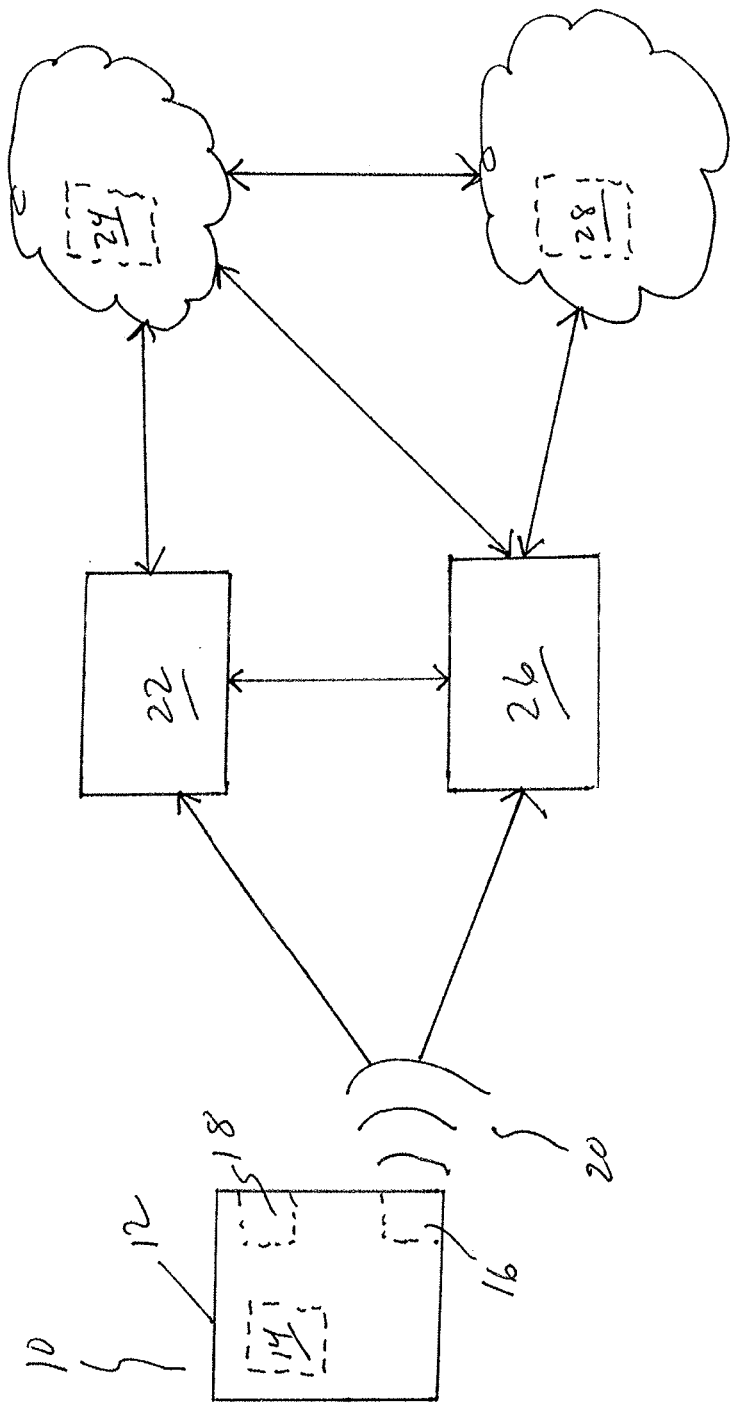
FIG. 2 is a schematic diagram of one embodiment of the present invention.

FIG. 2 illustrates one embodiment of a system according to the present invention. There, closed environment 10 is shown as a container 12 with asset 14, humidity sensor 16 and humidity controller 18, generally configured as in FIG. 1A.

As discussed above, the humidity controller 18 may comprise many alternatives or configurations. However, one highly preferred humidity controller 18 humidity controls the relative humidity in the container and/or asset housed within the container in the general range of 40% to 60%, the device comprising: (a) a pouch formed of a thin-walled polymeric material permeable to water vapor but not to liquid solutions; (b) a humidity control solution comprising saturated or unsaturated aqueous salt solution containing an amount of alkali metal formate selected from sodium formate, potassium formate, sodium or potassium lactate and combinations thereof sealed in said pouch wherein said salt solution contains from about 30% to 90% salt; and (c) wherein the water vapor permeability of the pouch is such that the moisture transfer capacity of the pouch transmits at least from about 1% to about 50% by weight of the initial pouch contents when exposed to an atmosphere of less than 10% relative humidity and absorbs at least from about 1% to about 50% by weight of the initial pouch content when exposed to an atmosphere having greater than 85% relative humidity.

In some embodiments, the pouch is disposed in a fabric holder for insertion into and retraction from a "bell hole" of an instrument. In certain embodiments, the pouch may be further configured to prevent leakage of the contents thereof.

FIG. 2 further provides that the humidity sensor 16 is in wireless operative communication 20, via in the illustration, a Wi-Fi bridge 22, with a cloud-based remotely located server, or set of servers 24. In addition, humidity sensor 16 is also in wireless operative communication with a computing device 26 which may also be remotely located from both the sensor 16 and the cloud-based server(s) 24. Further, the computing device 26 is in operative and wireless communication with the cloud-based server(s) 24 as well as a commerce platform 28 comprising servers and capable of an internet-based transaction. Finally, the cloud-based server(s) 25 and the commerce platform servers 28 are in wireless and operative communication.

The skilled artisan will recognize that computing device 26 may comprise a computer or a smartphone or the like.

The skilled artisan will also readily understand that the wireless communication ability of the humidity sensor to operatively communicate with the cloud-based server(s) 24 and/or the computing device 26 may be achieved in a number of ways, including but not limited to Bluetooth, RFID and/or QR code(s).

The skilled artisan will also realize that commerce platform servers 28 and the purchasing and delivery systems and methods embodied thereby are well known in the art.

Thus, FIG. 2 provides for a system wherein the humidity sensor 16 periodically provides humidity data from within the closed environment, e.g., within the container 12, wirelessly via, Bluetooth to e.g., a Wi-Fi bridge 22 and ultimately to the cloud-based server(s) 24 and/or the computing device 26.

Figure 3:
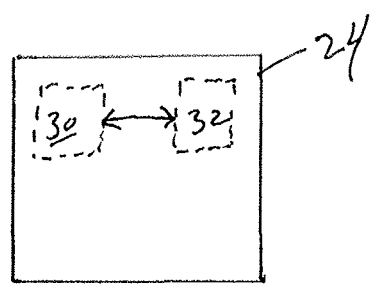
FIG. 3 is a schematic diagram of one embodiment of the present invention.

As best seen in FIGS. 2 and 3, the cloud-based server(s) 24 comprise a processor 30 configured to control at least some operations of the server(s) 24 and a memory 32 in operative communication with the processor 30. The memory 32 is capable of storing at least computer executable instructions, user addresses associated with an asset that is located at a remote location and that at least part of the time is stored within a container, and a look-up table listing more than one humidity controller arranged by humidity control capacity and/or useful life under known humidity conditions and a plurality of asset types associated with at least one of the listed humidity controllers, wherein the associated listed humidity controllers are optimized for controlling the humidity of the associated asset type.

The computer executable instructions stored in the server memory 32 are configured to be executed by the processor 30 that, when executed cause the server(s) 24 to:

look up the asset located at a remote location and the at least one associated humidity controller 18 in the look-up table;

select or identify the humidity controller 18 that is optimal for the asset 14;

in response to selecting or identifying the optimal humidity controller 18 for the asset 14, retrieve stored user addresses associated with the asset 14;

transmits the optimal humidity controller selection to the user addresses; and initiate and execute a transaction to purchase the optimal humidity controller 18 for delivery to the user.

In this way, the present invention may automatically select or identify, purchase and deliver the optimal humidity controller 18 to a user for a particular asset 14.

In addition, the present invention may be used to automatically identify/select, purchase and deliver an optimal replacement controller 18 to a user for a particular asset 14.

Thus, in addition to the above steps, the servers' processor (30) may further execute the programmed and executable instructions to:

determine the selected humidity controller's end of useful life;

identify an optimal humidity controller replacement;

automatically initiate and execute a transaction to purchase the optimal humidity controller replacement before the determined end of useful life; and deliver the optimal humidity controller replacement to the user before the determined end of useful life.

In some embodiments, identifying the optimal humidity controller may include one or more of:

Tracking the humidity levels over a duration. In certain embodiments, the tracking starts from when the humidity controller is first placed in service. In other embodiments, the tracking is over a pre-specified period;

Retrieving information that identifies the asset for which the humidity controller is or will be used for;

Retrieving information on the humidity controller currently in use. Such information may include one or more of the total number of humidity controllers in use and the identity of each humidity controller in use such as, but not limited to, the product model number and serial number. The retrieved information may also include information on when each humidity controller was placed into service such as, but not limited to, the installation date and/or time;

Retrieving information on where the asset is located including, but not limited, the geographic location and locale;

Determining the optimal replacement humidity controller for the housed asset based on tracked humidity levels, the retrieved asset identity, the retrieved information on the humidity controller currently in use with the asset, and the retrieved information on where the asset is located. In some embodiments, such determination may be made from a database of all the humidity controller products available. The database may include information such as, but not limited to, the performance, engineering and/or technical specifications for all the humidity controller products; and Recommending the determined optimal replacement humidity controller for purchase. In some embodiments, the user is provided comparative information on the humidity controller currently in service and the recommended replacement humidity controller. Such comparative information may be useful to the user in understanding why the recommended humidity controller is different from that in service. In certain embodiments, if the in-service and replacement humidity controller are the same, it may not be necessary to provide the comparative information. In other embodiments, the recommendation may include information such as the performance of the humidity controller in service.

In some embodiments, the initiation and/or execution of the transaction to purchase the humidity controller replacement may be manual or partly automated, i.e., not fully automated. In a non-limiting exemplary embodiment, the user is provided an option to select, for purchase, between the recommended and the in-service humidity controller. In some embodiments, the user may be provided an option to change the quantity and/or the type (e.g., product number) of the recommended or the in-service humidity controller being purchased. In certain embodiments, the user may be provided an option to select and/or order the desired quantity and/or the type of the humidity controller which may be different from the humidity controller currently in-service and/or the recommended humidity controller.

In some embodiments, the initiation and/or purchase of the humidity controller may include providing the user to select a payment method from a plurality of choices presented to the user. It will be appreciated that such transaction processing systems and methods are well known in the art. In a non-limiting exemplary embodiment, the purchase transaction may include a "one-click" payment option as is well known in the art. In certain embodiments, the payment transaction may further include providing the user an ability to change the payment method and/or update any previously stored payment related information.

In a non-limiting exemplary embodiment, the user is always provided an ability to cancel the transaction at any point in the process.

Still further, the present invention may be used to establish an optimal humidity controller replacement frequency, storing same within the server's memory. In this embodiment, the processor 30 may execute computer executable instructions that cause the server to:

establish an optimal humidity controller replacement frequency based on asset type and the determined end of useful life of the selected humidity controller;

automatically initiate and execute at least one transaction to purchase a first optimal humidity controller replacement before the selected humidity controller's determined end of useful life and in accordance with the established replacement frequency; and deliver the first optimal humidity controller replacement to the user before the selected humidity controller's determined end of useful life.

Thus, using an established replacement frequency enables repeated automated replacement, including identification/selection, purchase and delivery of the optimal replacement humidity controllers 18.

Figure 4:
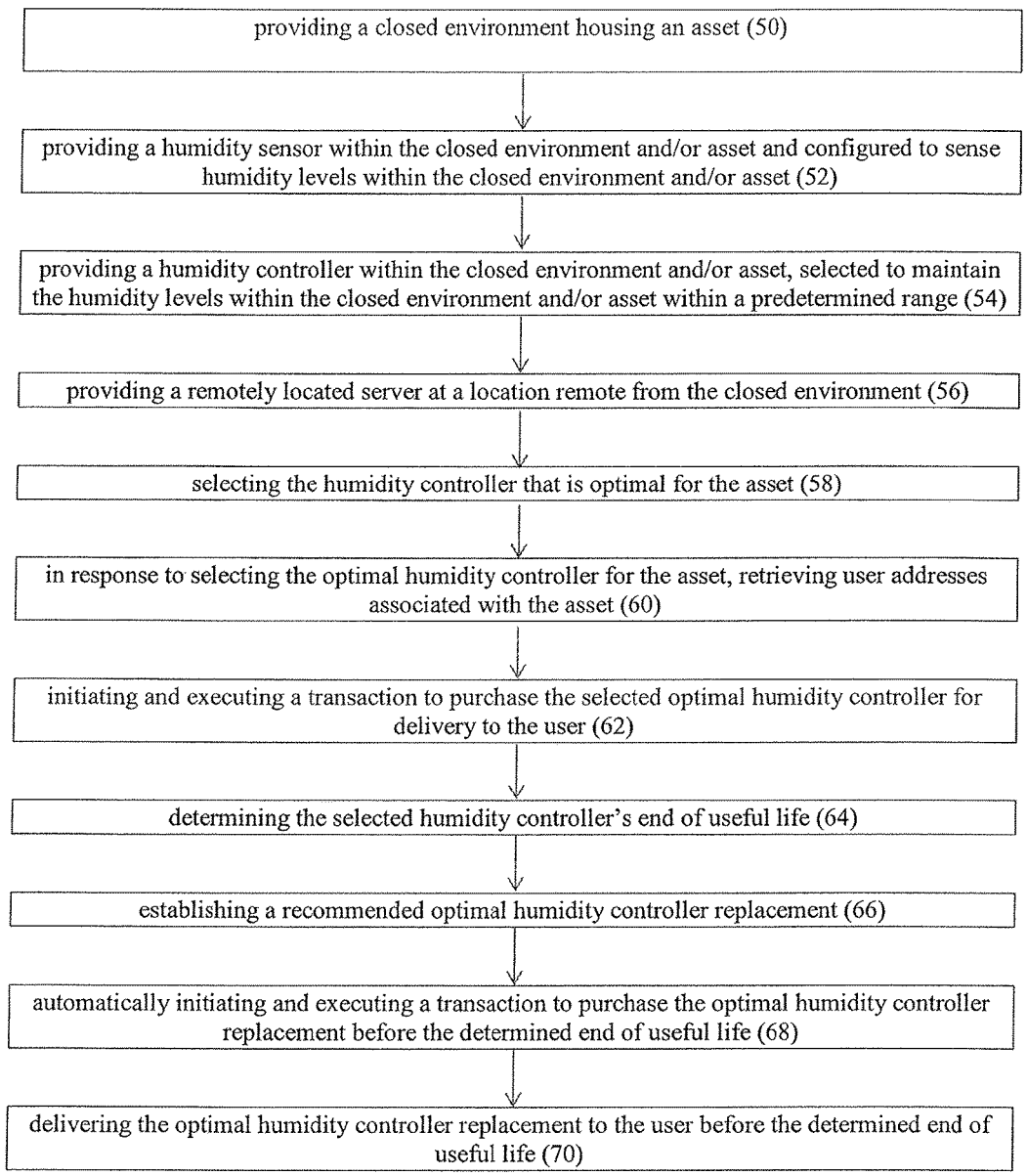
FIG. 4 is a flowchart of one embodiment of the present invention.

Turning now to FIG. 4, one embodiment of the inventive method is illustrated.

Initially, a closed environment 10 housing an asset 14 is provided in step 50.

Next, a humidity sensor is provided and located within the closed environment, either within a container 12 or within the asset 14 housed within the container 12 and configured to sense humidity levels therein in step 52.

A humidity controller 18 is provided within the closed environment 10 and is selected, either automatically using the invention or manually, to maintain the humidity levels within the closed environment and/or asset within a predetermined range in step 54.

A remotely located, cloud-based, server(s) 24 is provided at a location remote from the closed environment 10 is provided in step 56. The server(s) 24 are in operative and wireless communication with the humidity sensor 16. Generally, as described above, Bluetooth or similar wireless communication method may be used to facilitate wirelessly communicating the humidity data sensed within closed environment 10 to the server(s) 24 via, e.g., a Wi-Fi bridge 22.

Further, in response to selecting the optimal humidity controller for the asset, user addresses associated with the asset stored in the server(s) 24 memory are retrieved from the server(s) 24 memory 32 at step 60.

Next, a transaction to purchase the selected optimal humidity controller for delivery to the user is automatically initiated and executed, with subsequent delivery to the user addresses previously accessed in step 62.

In certain embodiments, the selected humidity controller's end of useful life is determined, accessing the relevant data from the memory 32 of server(s) 24 at step 64.

In certain embodiments, a recommended optimal humidity controller replacement may be determined and established in step 64, with subsequent automatically initiation and execution of a transaction to purchase the optimal humidity controller replacement before the determined end of useful life in step 68 and delivery of the optimal humidity controller replacement to the user before the determined end of useful life in step 70.

We claim:

1. A system for automatically providing a replacement humidity controller to replace a user's humidity controller used to maintain humidity levels within a closed environment housing an asset, the system comprising:

a humidity controller controlling the relative humidity within the closed environment in the general range of 30%-95%, the humidity controller comprising:
a pouch formed of a thin-walled polymeric material permeable to water vapor but not to liquid solutions; and
a humidity control material comprising at least one of: a salt, sugar, sugar alcohol, polybasic acid, and salt of a polybasic acid;

wherein the water vapor permeability of the pouch is such that the moisture transfer capacity of the pouch transmits at least from about 1% to about 50% by weight of the initial pouch contents when exposed to an atmosphere of less than 10% relative humidity and absorbs at least from about 1% to about 50% by weight of the initial pouch content when exposed to an atmosphere having greater than 85% relative humidity;

a humidity sensor located within the container, wherein the humidity sensor senses the humidity level within the closed environment;

a server located remotely from the humidity sensor, the server in operative wireless communication with the humidity sensor; and a database storing, as non-transitory computer readable media, user address information, asset identifying information, humidity controller information, and a lookup table listing a plurality of humidity controllers and a plurality of asset types, each asset type associated with at least one of the listed humidity controllers, wherein the associated listed humidity controllers are optimized for controlling the humidity of the associated asset type, the database further storing computer executable instructions for:

receiving a sensed humidity condition from the humidity sensor and tracking the sensed humidity condition over a duration;

comparing the sensed humidity condition to a controlled humidity range for the asset and, if the sensed humidity condition is outside of the controlled humidity range, determining the humidity controller is nearing the end of its useful life;

based, at least in part, on the sensed humidity condition tracked over a duration, stored lookup table, stored asset identifying information, and stored humidity controller information, forming a recommendation of an optimal replacement humidity controller for the housed asset, wherein the recommendation comprises a type of controller and number of controllers; and sending the recommendation of the optimal replacement humidity controller to a user device.

2. The system of claim 1, wherein the stored humidity controller information comprises:
total number of humidity controllers in use;
identity of each humidity controller in use; and
installation date of each humidity controller in use.

3. The system of claim 1, the database further storing computer executable instructions for retrieving the stored user address information and initiating a purchase transaction for the optimal replacement humidity controller.

4. The system of claim 3, wherein initiating the purchase transaction comprises providing the user an ability to change the purchase.

5. The system of claim 4, wherein initiating the purchase transaction further comprises providing the user a purchasing option selected from the group consisting of the recommended optimal replacement humidity controller and the stored humidity controller information.

6. The system of claim 3, wherein initiating the purchase transaction comprises the user selecting a payment method comprising one of a previously provided payment method and a new payment method.

7. The system of claim 1, the database further storing computer executable instructions for:

establishing a frequency for purchasing and replacing the user's humidity controller; and automatically identifying, purchasing, initiating delivery of an optimal replacement humidity controller to the user address in accordance with the established frequency.

8. The system of claim 1, further comprising computer executable instructions for initiating delivery of the replacement humidity controller to the user address.

9. The system of claim 1, wherein the humidity controller controls the relative humidity within the closed environment in the general range of 40%-75%.

10. The system of claim 1, wherein the recommended optimal humidity controller is different from the humidity controller within the enclosed environment.

11. The system of claim 1, wherein the recommended optimal humidity controller comprises a plurality of controllers.

12. A system for monitoring and controlling humidity levels within a container that houses an asset owned or operated by a user, the system comprising:

a humidity sensor located within the container, wherein the humidity sensor periodically senses the humidity experienced by the asset;

a remote server in operative wireless communication with the humidity sensor, wherein the server receives and stores sensed humidity data transmitted from the humidity sensor;

a humidity controller controlling the relative humidity within the closed environment in the general range of 30%-95%, the humidity controller comprising:

a pouch formed of a thin-walled polymeric material permeable to water vapor but not to liquid solutions; and a humidity control material comprising at least one of: a salt, sugar, sugar alcohol, polybasic acid, and salt of a polybasic acid;

wherein the water vapor permeability of the pouch is such that the moisture transfer capacity of the pouch transmits at least from about 1% to about 50% by weight of the initial pouch contents when exposed to an atmosphere of less than 10% relative humidity and absorbs at least from about 1% to about 50% by weight of the initial pouch content when exposed to an atmosphere having greater than 85% relative humidity;

a remote computing device in wireless operable communication with at least one of the server and the humidity sensor to enable the user to view the stored sensed humidity data; and the at least one server further configured to:

based on the stored sensed humidity data, predict an end of the humidity controller's useful life;

before the end of the humidity controller's predicted useful life, automatically form a recommendation of an optimal replacement humidity controller based at least in part on the stored sensed humidity data and identifying information for the asset and the humidity controller, the recommendation comprising a type of controller and number of controllers; and send the recommendation of the optimal replacement humidity controller to the remote computing device.

13. The system of claim 12, wherein the asset comprises a stringed instrument or tobacco products.

14. The system of claim 12, wherein the humidity control material comprises a saturated aqueous salt solution containing an amount of alkali metal formate selected from sodium formate, potassium formate, sodium or potassium lactate and combinations thereof sealed in said pouch wherein said salt solution contains from about 30% to about 90% salt.

15. The system of claim 12, wherein the at least one server is further configured to, before the end of the optimal humidity controller's predicted useful life, initiate a transaction to purchase the determined optimal replacement humidity controller with notification to the user's computing device.

16. The system of claim 15, wherein the at least one server is further configured to, before the end of the optimal humidity controller's predicted useful life, initiate delivery of the purchased optimal replacement humidity controller to the user.

17. The system of claim 12, wherein the humidity controller controls the relative humidity within the closed environment in the general range of 40%-75%.

18. A method of controlling humidity in a closed environment, the method comprising:
   providing a closed environment housing an asset;
   providing a humidity sensor within the closed environment and configured to sense humidity levels within the closed environment;
   providing a humidity controller within the closed environment, selected to maintain the humidity levels within the closed environment in the general range of 30%-95%, the humidity controller comprising:
      a pouch formed of a thin-walled polymeric material permeable to water vapor but not to liquid solutions; and
      a humidity control material comprising at least one of: a salt, sugar, sugar alcohol, polybasic acid, and salt of a polybasic acid;
      wherein the water vapor permeability of the pouch is such that the moisture transfer capacity of the pouch transmits at least from about 1% to about 50% by weight of the initial pouch contents when exposed to an atmosphere of less than 10% relative humidity and absorbs at least from about 1% to about 50% by weight of the initial pouch content when exposed to an atmosphere having greater than 85% relative humidity;
   providing a remotely located server at a location remote from the closed environment, the server comprising:
      a processor in the remotely located server configured to control at least some operations of the server; and
      a memory in operative communication with the processor and storing computer executable instructions, user addresses associated with the asset, asset identifying information, humidity controller information, and a look-up table listing a plurality of humidity controllers and a plurality of asset types, each asset type associated with at least one of the listed humidity controllers, wherein the associated listed humidity controllers are optimized for controlling the humidity of the associated asset type; and
   executing the computer executable instructions to enable:
      receiving data from a humidity sensor arranged within the container, the data comprising a sensed humidity condition within the container, and tracking the sensed humidity condition over a duration;
      comparing the sensed humidity condition to a controlled humidity range for the asset and, if the sensed humidity condition is outside of the controlled humidity range, determining the humidity controller is nearing the end of its useful life;
      using the stored asset identifying information, looking up the asset and the at least one associated humidity controller in the look-up table;
      based, at least in part, on the sensed humidity condition tracked over a duration and the stored humidity controller information, forming a recommendation of an optimal humidity controller for the asset;
      retrieving user addresses associated with the asset;
      transmitting the recommendation of an optimal humidity controller to the user addresses; and
      determining the selected humidity controller's end of useful life based on the sensed humidity condition within the container.

19. The method of claim 18, further comprising:
   establishing a recommended optimal humidity controller replacement;
   automatically initiating and executing a transaction to purchase the optimal humidity controller replacement before the determined end of useful life; and
   initiating delivery of the optimal humidity controller replacement to the user before the determined end of useful life.

20. The method of claim 18, wherein the humidity control material comprises a saturated aqueous salt solution containing an amount of alkali metal formate selected from sodium formate, potassium formate, sodium or potassium lactate and combinations thereof sealed in said pouch wherein said salt solution contains from about 30% to about 90% salt.

21. The method of claim 18, wherein the humidity controller within the closed environment and/or asset is selected to maintain the humidity levels within the closed environment and/or asset in the general range of 40%-75%.

* * * * *

UNITED STATES PATENT AND TRADEMARK OFFICE
CERTIFICATE OF CORRECTION

PATENT NO. : 10,055,781 B2
APPLICATION NO. : 14/732079
DATED : August 21, 2018
INVENTOR(S) : Jason L. Schmitz, Robert L. Esse and Sean A. Knutsen Page 1 of 1

It is certified that error appears in the above-identified patent and that said Letters Patent is hereby corrected as shown below:

In the Specification

Column 1, Line 49, delete "marked" and insert --marketed-- therefor.

Column 3, Line 24, delete "humidity controller" after number 18.

Signed and Sealed this
Sixth Day of November, 2018

Andrei Iancu
*Director of the United States Patent and Trademark Office*